US012582975B2

(12) United States Patent (10) Patent No.: US 12,582,975 B2

Amos-Reichert et al. (45) Date of Patent: Mar. 24, 2026

(54) METHOD OF FORMING A CATALYST ARTICLE ON A SUBSTRATE

(71) Applicants: Johnson Matthey Public Limited Company, London (GB); Johnson Matthey Catalysts (Germany) GmbH, Redwitz (DE)

(72) Inventors: Nikki Jane Amos-Reichert, Redwitz (DE); Daniel Avis, Royston (GB); Juergen Bauer, Redwitz (DE); Yannick Bidal, Royston (GB); Guy Richard Chandler, Royston (GB); Alexander Nicolas Michael Green, Royston (GB); Neil Greenham, Royston (GB); Matthew Eben Harris, Royston (GB); Sofia Lopez-Orozco, Redwitz (DE); Joerg Muench, Redwitz (DE); Paul Richard Phillips, Royston (GB); Irene Piras, Redwitz (DE)

(73) Assignees: Johnson Matthey Public Limited Company, London (GB); Johnson Matthey Catalysts (Germany) GmbH, London (GB)

( * ) Notice: Subject to any disclaimer, the term of this patent is extended or adjusted under 35 U.S.C. 154(b) by 251 days.

(21) Appl. No.: 17/303,290

(22) Filed: May 26, 2021

(65) Prior Publication Data

US 2021/0379576 A1 Dec. 9, 2021

(30) Foreign Application Priority Data

Jun. 3, 2020 (EP) .................................... 20177967

(51) Int. Cl.
| | |
|---|---|
| *B01J 37/02* | (2006.01) |
| *B01J 29/76* | (2006.01) |
| *B01J 35/56* | (2024.01) |
| *B01J 37/00* | (2006.01) |
| *B01J 37/08* | (2006.01) |

(52) U.S. Cl.
CPC ......... *B01J 37/0045* (2013.01); *B01J 29/763* (2013.01); *B01J 35/56* (2024.01); *B01J 37/08* (2013.01)

(58) Field of Classification Search
None
See application file for complete search history.

(56) References Cited

U.S. PATENT DOCUMENTS

| | | | |
|---|---|---|---|
| 2009/0285737 A1 | 11/2009 | Bull | |
| 2011/0064633 A1* | 3/2011 | Huang | F01N 13/0097 |
| | | | 423/213.2 |
| 2011/0165052 A1 | 7/2011 | Beutel et al. | |
| 2013/0195731 A1* | 8/2013 | Bull | B01J 29/76 |
| | | | 422/171 |
| 2015/0132215 A1 | 5/2015 | Bull | |
| 2015/0246345 A1 | 9/2015 | Collier et al. | |
| 2015/0252708 A1 | 9/2015 | Brown et al. | |
| 2016/0045868 A1* | 2/2016 | Sonntag | B01J 37/0246 |
| | | | 422/171 |
| 2016/0346770 A1* | 12/2016 | Kilmartin | B01J 37/30 |
| 2016/0367941 A1* | 12/2016 | Gilbert | B01D 53/9472 |
| 2017/0259248 A1 | 9/2017 | Dornhaus et al. | |
| 2018/0021768 A1* | 1/2018 | Chandler | B01J 35/04 |
| | | | 502/66 |
| 2019/0083967 A1* | 3/2019 | Yang | B01J 38/02 |
| 2019/0322537 A1 | 10/2019 | Kim | |
| 2020/0086303 A1 | 3/2020 | Hong et al. | |
| 2022/0258141 A1 | 8/2022 | Liu | |

FOREIGN PATENT DOCUMENTS

| | | | |
|---|---|---|---|
| EP | 3015167 A1 | | 5/2016 |
| JP | H11147041 A | | 2/1999 |
| JP | 2014210221 | * | 11/2014 |
| JP | 2016505359 A | | 2/2016 |
| JP | 2017060945 A | | 3/2017 |
| JP | 2018187631 A | | 11/2018 |
| JP | 2020513305 A | | 5/2020 |
| WO | 2013179129 | * | 12/2013 |
| WO | 2020089043 A1 | | 5/2020 |
| WO | 2020109810 A1 | | 6/2020 |

OTHER PUBLICATIONS

Copper Carbonate. Explore Materials at the Nanoscale. 2024 (Year: 2024).*

* cited by examiner

*Primary Examiner* — Sheng H Davis

(74) *Attorney, Agent, or Firm* — BakerHostetler

(57) ABSTRACT

The present disclosure relates to a method for forming a catalyst article comprising: (a) forming a slurry having a solids content of up to 50 wt % by mixing together at least the following components a crystalline molecular sieve in an $H^+$ or $NH_4^+$ form, an insoluble active metal precursor and an aqueous solvent at a temperature in the range 10 to 35° C.; (b) coating a substrate with the slurry formed in step (a); and (c) calcining the coated substrate formed in step (b) to form a catalyst layer on the substrate. The present disclosure further relates to a catalyst article, particularly a catalyst article which is suitable for use in the selective catalytic reduction of nitrogen oxides, and to an exhaust system.

20 Claims, 2 Drawing Sheets

METHOD OF FORMING A CATALYST ARTICLE ON A SUBSTRATE

This present application claims priority to and the benefit of European patent application no. 20177967.5 filed on 3 Jun. 2020, the entirety of which application is incorporated herein by reference.

FIELD OF THE INVENTION

The present invention relates to a method for forming a catalyst article. In particular, the present invention relates to a method for forming a catalyst article suitable for use in the selective catalytic reduction of nitrogen oxides (NOx) in an exhaust gas.

BACKGROUND OF THE INVENTION

Large numbers of catalytic converters used for the treatment of emissions from mobile and stationary sources are manufactured each year. Catalytic converters for use in motor-vehicles typically comprise an extruded ceramic monolith that is provided with channels for the through-flow of exhaust gases. The channels of the monolith may be coated with a catalytically active material. Alternatively, the extruded monolith itself is formed of a catalytically active material (referred to as an "all-active extrudate" or "extruded catalyst").

In the production of a coated catalyst, a composition known as a "washcoat" is applied to a substrate (e.g. a ceramic monolith). A washcoat typically comprises a liquid and a catalytically active material. The washcoat may take the form of a solution, slurry or suspension of catalytic material in a solvent. Once coated onto the substrate, the washcoat typically undergoes a calcination step, to remove solvent and to fix the catalytically active material to the substrate.

Substrates for use in catalytic converters generally comprise a unitary structure in the form of a honeycomb having uniform-sized and parallel channels extending from a first end to a second end thereof. Generally, the channels are open at both the first and second ends—a so-called "flow through" configuration. Alternatively, channels at a first, upstream end can be plugged, e.g. with a suitable ceramic cement, and channels not plugged at the first, upstream end can also be plugged at a second, downstream end to form a so-called wall-flow filter.

The selective catalytic reduction of nitrogen oxides (NOx) by ammonia (NH3-SCR) is considered to be the most practical and efficient technology for the abatement of NOx from exhaust gases emitted from stationary sources and mobile engines, principally diesel engines for vehicles such as automobiles, trucks, locomotives and ships.

Known SCR (selective catalytic reduction) catalysts include molecular sieves. Useful molecular sieves include crystalline or quasi-crystalline materials which can be, for example aluminosilicates (zeolites) or silicoaluminophosphates (SAPOs). Such molecular sieves are constructed of repeating SiO4, AlO4, and optionally PO4 tetrahedral units linked together, for example in rings, to form frameworks having regular intra-crystalline cavities and channels of molecular dimensions. The specific arrangement of tetrahedral units (ring members) gives rise to the molecular sieves framework, and by convention, each unique framework is assigned a unique three-letter code (e.g., "CHA") by the International Zeolite Association (IZA). Examples of molecular sieve frameworks that are known SCR catalysts include Framework Type Codes CHA (chabazite), BEA (beta), MOR (mordenite), AEI, MFI and LTA.

Molecular sieves (e.g. zeolites) may also be categorised by pore size, e.g. a maximum number of tetrahedral atoms present in a molecular sieve's framework. As defined herein, a "small pore" molecular sieve, such as CHA, contains a maximum ring size of eight tetrahedral atoms, whereas a "medium pore" molecular sieve, e.g. MFI, contains a maximum ring size of ten tetrahedral atoms; and a "large pore" molecular sieve, such as BEA, contains a maximum ring size of twelve tetrahedral atoms. Small and medium pore molecular sieves, especially small pore molecular sieves, are preferred for use in SCR catalysts, since they may, for example, provide improved SCR performance and/or improved hydrocarbon tolerance.

Molecular sieve catalysts, may be metal-promoted. Examples of metal-promoted molecular sieve catalysts include iron-, copper- and palladium-promoted molecular sieves, where the metal may be loaded into the molecular sieve. In a metal-loaded molecular sieve, the loaded metal is a type of "extra-framework metal", that is, a metal that resides within the molecular sieve and/or on at least a portion of the molecular sieve surface and does not include atoms constituting the framework of the molecular sieve. Iron- and copper-loaded zeolites, for example, are known to promote SCR reactions.

Several methods have been mentioned in the literature for preparing metal-loaded molecular sieves, in particular metal-loaded zeolites. The direct synthesis of metal-loaded zeolites is a complicated process and depends on the synthesis conditions (see M. Moliner, ISRN Materials Science, 2012, Article ID 789525). An alternative is to use a commercial zeolite support and to subsequently add metal by post-synthesis treatment of the zeolite, for example, by wet impregnation, wet ion exchange or solid-state ion exchange.

Known wet ion-exchange methods for the addition of metal to molecular sieves (e.g. zeolites) typically employ soluble metal salts, such as metal acetates, metal sulphates or metal chlorides as the active metal precursor, wherein the active metal precursor is reacted with the molecular sieve in aqueous solution. In order to accelerate ion-exchange, such processes typically require a heating step, wherein the mixture may be heated to a temperature in the range 70 to 80° C. for up to several hours. Further, additional processing steps (e.g. filtering, evaporation, spray-drying etc) may be required before the resulting metal-loaded molecular sieve may be employed in a washcoat composition for the formation of a catalyst article. Further still, it has been found that where certain metal-acetates (e.g. copper actetate) are employed to prepare metal-loaded molecular sieves (e.g. metal-loaded zeolites) for use as SCR catalysts, any residual metal acetate remaining after calcination may have a poisoning effect on ammonia slip catalysts (ASCs) which are used downstream of or proximal to the SCR catalyst.

The present invention provides an improved process for the preparation of washcoated catalyst articles which employ a metal-loaded crystalline molecular sieve as a catalytically active material.

According to a first aspect of the present disclosure there is provided a method for forming a catalyst article comprising:

(a) forming a slurry by mixing together at least the following components:
        (i) a crystalline molecular sieve in an $H^+$ or $NH_4^+$ form;
        (ii) an insoluble active metal precursor;
        (iii) an aqueous solvent;

wherein the slurry has a solids content of up to 50 weight % and wherein step (a) is carried out at a temperature in the range 10 to 35° C.;

(b) coating a substrate with the slurry formed in step (a); and (c) calcining the coated substrate formed in step (b) to form a catalyst layer on the substrate.

Advantageously, it has been found that the heat employed to calcine the coated substrate may be exploited to promote metal-loading onto the molecular sieve. Thus, the requirement for any heating steps during wet ion-exchange or impregnation processes and the requirement for expensive, high-temperature-resistant equipment may be avoided. Further, long reaction times typical in wet ion-exchange or impregnation processes and/or energy and labour-intensive processes such as spray-drying may be avoided. Consequently, the method according to the first aspect may be more energy efficient and economical.

Furthermore, it has been found that the slurry prepared in step (a) of the method according to the first aspect may be employed directly as a washcoat composition without the need for any further processing steps.

Further still, the use of insoluble metal species, such as metal carbonates, as active metal precursors may result in the generation of fewer hazardous species during calcination compared to when metal acetates are used as active metal precursors. Thus, the use of insoluble active metal precursors may provide health and safety benefits.

Additionally, it has been found that catalysts prepared via the process according to the first aspect may provide at least comparable SCR activity to catalysts comprising metal-loaded molecular sieves (e.g. metal-loaded zeolites) which were prepared via wet ion exchange or impregnation. Moreover, it has been found that poisoning of associated ammonia slip catalysts may be mitigated compared to catalysts comprising metal-loaded molecular sieves which have been prepared using metal acetates as the active metal precursor.

According to a second aspect of the present disclosure, there is provided a catalyst article obtained or obtainable according to the method of the first aspect.

According to a third aspect of the present disclosure, there is provided an exhaust system comprising: a source of nitrogenous reductant and an injector for injecting a nitrogenous reductant into a flowing exhaust gas, wherein the injector is disposed upstream from a catalyst article according to the second aspect.

DETAILED DESCRIPTION

Figure 1:
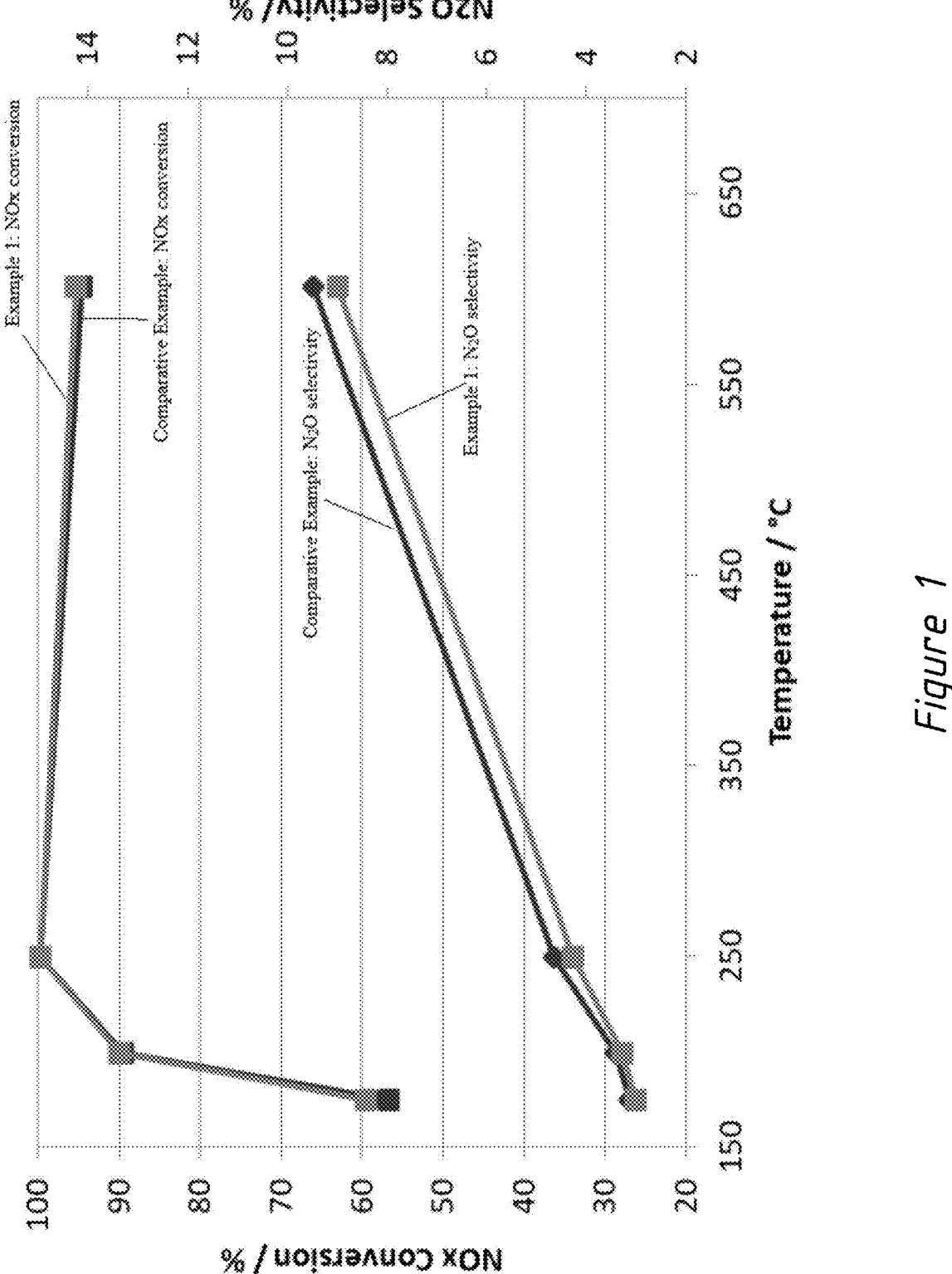
FIG. 1 is a graph showing NOx conversion and N2O selectivity achieved by a catalyst article prepared according to the first aspect of the present disclosure compared with a catalyst article prepared via a prior art method.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Further, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The crystalline molecular sieve is typically composed of aluminium, silicon, and/or phosphorus. The crystalline molecular sieve generally has a three-dimensional arrangement (e.g. framework) of repeating SiO4, AlO4, and optionally PO4 tetrahedral units that are joined by the sharing of oxygen atoms.

The term "H+-form" in relation to a molecular sieve refers to a molecular sieve having an anionic framework wherein the charge of the framework is counterbalanced by protons (i.e. H+ cations).

The term NH4+ form in relation to a molecular sieve refers to a molecular sieve having an anionic framework wherein the charge of the framework is counterbalanced by ammonium cations (NH4+ cations).

When the crystalline molecular sieve has an aluminosilicate framework, then the molecular sieve is preferably a zeolite.

The molecular sieve may be a small pore molecular sieve (i.e. having a maximum ring size of eight tetrahedral atoms) or a medium pore molecular sieve (i.e. having a maximum ring size of ten tetrahedral atoms).

Where the crystalline molecular sieve is a small pore molecular sieve, the small pore molecular sieve may be selected from the group of Framework Types consisting of ACO, AEI, AEN, AFN, AFT, AFX, ANA, APC, APD, ATT, CDO, CHA, DDR, DFT, EAB. EDI, EPI, ERI, GIS, GOO, IHW, ITE, ITW, KFI, LEV, LTA, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably, the small pore molecular sieve has a Framework Type selected from the group of Framework Types consisting of AEI, AFT, AFX, CHA, DDR, ERI, KFI, LEV, LTA, SFW and RHO. More preferably, the small pore crystalline molecular sieve has a Framework Type that is AEI, AFX, CHA, LTA, ERI or AEI-CHA intergrowth.

Where the crystalline molecular sieve is a medium pore molecular sieve, the medium pore molecular sieve can be selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore crystalline molecular sieve is selected from the group of Framework Types consisting of FER, MEL, MFI, STI and STT.

Preferably, the crystalline molecular sieve is a small pore molecular sieve having the Framework Type CHA, AEI, AFX, LTA or ERI.

Wherein the crystalline molecular sieve is a zeolite, the zeolite may have a silica-to-alumina ratio (SAR) of 5 to 200, preferably 5 to 100, more preferably 10 to 80. For example, the zeolite may have a silica-to-alumina ratio (SAR) of 5 to 30.

Where the crystalline molecular sieve is a SAPO, the SAPO may have a silicon content in the range 5 to 30 wt %, preferably 8 to 16 wt % (based on total weight of the molecular sieve).

The crystalline molecular sieve is preferably a powdered crystalline molecular sieve (i.e. in particulate form), wherein the particles comprise individual crystals, agglomerations of crystals or a combination of both. The crystalline molecular sieve may have a mean crystal size, as measured by scanning electron microscopy (SEM), of ≥0.5 μm, preferably between about 0.5 and about 15 μm, such as about 0.5 to 10 μm, about 0.5 to about 5 μm, about 1 to about 5 μm, or about 2 to about 5 μm.

The powdered crystalline molecular sieve preferably has a D90 particle size of less than 10 μm. For example, the powdered crystalline molecular sieve may have a D90 particle size in the range 2 to 9 μm, preferably 3 to 8 μm. The term "D90 particle size" as used herein refers to particle size distribution. A value for D90 particle size corresponds to the particle size value below which 90%, by volume, of the total particles in a particular sample lie. The D90 particle size may be determined using a laser diffraction method (e.g. using a Malvern Mastersizer 2000).

If desired, prior to forming the slurry in step (a) of the method of the first aspect, the molecular sieve may undergo a particle size reduction treatment such as jet milling, wet milling or steam assisted jet-milling.

The components to be mixed together in step (a) of the first aspect may include two or more crystalline molecular sieves in an H+ or NH4+ form. Consequently, the resulting catalyst layer formed in step (c) may comprise two or more different types of metal-loaded molecular sieve.

As used herein "active metal precursor" refers to a metal species which is capable of supplying an extra framework metal to the crystalline molecular sieve. The term "extra-framework metal", as used herein, refers to a metal that resides within the molecular sieve (i.e. within the micropore structure, either in an ion-exchange position or non-ion exchange position) and/or on at least a portion of the molecular sieve surface (for example, in an ionic or oxide form), and does not include metal atoms of the tetrahedral units which constitute the framework of the molecular sieve. It will be understood that additional metal species may be present in the slurry formed in step (a) which would not themselves take part in metal-loading.

By "insoluble active metal precursor" it is meant an active metal precursor which is insoluble in water. In particular, the insoluble active metal precursor may have a water solubility of less than 1 g/100 ml, for example less than 0.1 g/100 ml or less than 0.01 g/100 ml. The property water solubility is a measure of the quantity of a material that will dissolve in a certain volume of water at a specified temperature and pressure to form a saturated solution. As used herein, the term "water solubility" in relation to the insoluble active metal precursor, means the quantity (in grams) of the insoluble active metal precursor which will dissolve in 100 millilitres of water (g/100 ml) at a temperature of 20° C. and a pressure of 1 atmosphere.

Suitable insoluble active metal precursors include certain metal salts. In particular, the insoluble active metal precursor may be a metal carbonate, a metal hydroxide or a metal oxalate.

The insoluble active metal precursor preferably comprises a metal salt which undergoes thermal decomposition by thermolysis at temperatures of less than 500° C.

The insoluble active metal precursor may comprise a salt of a transition metal, a noble metal or a rare earth metal. For example, the insoluble active metal precursor may comprise one or more insoluble salts of copper, manganese, nickel, cobalt, iron, palladium, platinum, cerium, yttrium, niobium, lanthanum, zinc, calcium, magnesium or any mixture of two or more thereof.

In particular, the insoluble active metal precursor may be selected from the group consisting of copper carbonate, manganese carbonate, nickel carbonate, cobalt carbonate, iron carbonate, palladium carbonate, platinum carbonate, cerium carbonate, yttrium carbonate, niobium carbonate, lanthanum carbonate, zinc carbonate, zirconium carbonate, calcium carbonate, magnesium carbonate, copper hydroxide, manganese hydroxide, nickel hydroxide, cobalt hydroxide, iron hydroxide, palladium hydroxide, platinum hydroxide, cerium hydroxide, yttrium hydroxide, niobium hydroxide, lanthanum hydroxide, zinc hydroxide, zirconium hydroxide, calcium hydroxide, magnesium hydroxide, copper oxalate, calcium oxalate, iron oxalate, manganese oxalate, cobalt oxalate, cerium oxalate, yttrium oxalate, zinc oxalate and any mixture of two or more thereof.

Preferably, the insoluble active metal precursor may comprise one or more of: copper (II) carbonate, copper (II) hydroxide, and copper oxalate. More preferably, the insoluble active metal precursor comprises copper (II) carbonate. In one example, the insoluble active metal precursor may comprise a mixture of copper (II) carbonate and cerium carbonate.

In addition to the insoluble active metal precursor, the components to be mixed in step (a) may further include a soluble (i.e. soluble in water) active metal precursor. Suitable soluble active metal precursors may include soluble metal salts, such as metal acetates or metal nitrates, or a mixture of any two or more thereof. In one example, the insoluble active metal precursor may comprise copper carbonate and the soluble active metal precursor may comprise cerium acetate.

The relative quantities of the molecular sieve and the insoluble active metal precursor employed in step (a) will depend on the targeted metal loading of the molecular sieve and the quantity of any soluble active metal precursors employed. Metal-loaded molecular sieve present in the catalyst layer produced in step (c) may have a metal-loading of 0.1% to S 10% by weight, preferably ≥0.1% and 7% by weight, more preferably 0.1% and 5% by weight.

In particular, wherein the crystalline molecular sieve is a zeolite, the relative quantities of the molecular sieve, the insoluble active metal precursor and any soluble active metal precursors employed in step (a) may be selected to provide a metal to alumina ratio in the metal-loaded zeolite in the range 0.2 to 0.5, preferably 0.3 to 0.5.

As used herein, the term "aqueous solvent" refers to an aqueous liquid medium (i.e. a water-containing liquid medium) and does not necessarily denote that any components are dissolved therein. For example, the aqueous solvent may be a water-containing liquid medium in which, during step (a), components (i) and (ii) become dispersed. However, it will be understood by the skilled person, that partial or full dissolution of some components in the aqueous solvent may occur. For example, rheology modifiers which may optionally be employed in step (a) may themselves dissolve in the aqueous solvent. Preferably, the aqueous solvent consists essentially of water. That is the aqueous solvent contains water but may also contain minor non-aqueous (e.g. organic or inorganic) impurities. The water may be deionised or demineralised water.

The slurry formed in step (a) has a solids content of up to 50 wt %. By "solids content" it is meant the proportion of solid material present in the slurry based on the total weight of the slurry. The solids content of the slurry is preferably in the range 30 to 50 wt %, more preferably in the range 30 to 48 wt %.

The components to be mixed together in step (a) may further include binder components, rheology modifiers and/or other additives.

In particular, the components to be mixed together in step (a) may further include a binder component selected from alumina, alumina precursors (such as boehmite and/or bayerite), aluminium hydroxide, TiO2, SiO2, ZrO2, CeZrO2, SnO2, an aluminophosphate, non-zeolitic aluminosilicate, silica-alumina, clays or mixtures thereof.

The binder may be present in the slurry in an amount in the range 5 to 15 wt. %, preferably 8 to 12.5 wt. %, for example 10 to 12.5 wt. % based on total weight of the slurry.

The components to be mixed together in step (a) may further include a rheology modifier. The rheology modifier may be selected from a polysaccharide, a starch, a cellulose, an alginate, or mixtures thereof. The rheology modifier may be present in the slurry in an amount of up to 0.4 wt %, preferably ≤0.2 wt. %.

Optionally, the components to be mixed together in step (a) may further include organic additives, such as pore formers, surfactants, and/or dispersants as processing aids.

In some embodiments, the components to be mixed together in step (a) may further include additional catalytically active materials (such as materials active for catalysis of ammonia slip), for example, where it is desired that the catalyst article is multi-functional (i.e. performs more than catalytic function).

The relative quantities of each component employed in step (a) may be selected such that the slurry has the required solids content, and such that the catalyst layer formed in step (c), after removal of solvent and any organics, comprises the desired proportion of metal-loaded molecular sieve. This is well within the capabilities of the skilled person. Preferably, the relative quantities of each component employed in step (a) are chosen such that the catalyst layer formed in step (c) comprises 85 to 92 wt % of metal-loaded molecular sieve and 8 to 15 wt % binder.

In step (a) the slurry is formed by mixing together the components. Preferably, the slurry is substantially uniform (e.g. homogeneous), that is, the distribution of components throughout the slurry is substantially even. The components may be mixed by any suitable method. Preferably, the components are mixed by stirring.

Optionally, the pH of the slurry may be adjusted by the addition of an acid or a base. Advantageously, it has been found that variability of the pH of the slurry has little impact on the performance of SCR catalysts prepared according to the method of the first aspect. This is in contrast with some prior art methods where pH of the washcoat composition is known to influence the performance of the final catalyst.

Step (a) may be carried out at ambient temperature. Preferably, step (a) is carried out at a temperature in the range 10 to 30° C., preferably 18 to 28° C.

A particular advantage of the present invention is that the slurry formed in step (a) may be used directly as a washcoat composition. Thus, the slurry formed in step (a) may be employed directly in step (b) without any additional processing steps.

In step (b), the slurry formed in step (a) may be coated onto a substrate by washcoating techniques well known in the art. One such method involves positioning a monolith substrate such that the channels have a substantially vertical orientation, applying washcoat to a first face of the substrate (e.g. an upper face) and subjecting an opposite, second face (e.g. a lower face) of the substrate to at least a partial vacuum to achieve movement of the washcoat through the channels. The monolith substrate may be coated in a single dose wherein washcoat may be applied to the substrate in a single step with the substrate remaining in a single orientation. Alternatively, the substrate may be coated in two doses. For example, in a first dose the monolith substrate is in a first orientation with a first face uppermost and a second face is lowermost. A coating is applied to the first face and coats a portion of the length of the substrate. The substrate is then inverted so that the second face is uppermost. A coating is then applied to the second face in order to coat the portion of the substrate that was uncoated by the first dose. WO 99/47260 describes a general method for coating a monolithic substrate.

The coating should be applied to the substrate in an amount which is sufficient to provide the desired washcoat loading. Preferably, the coating is applied in an amount sufficient to provide a washcoat loading in the range 0.5 to 5 g/in3, preferably in the range 1.5 to 3.5 g/in3.

The substrate is preferably a honeycomb monolith substrate. Honeycomb monoliths are well known in the art. "Honeycomb monolith substrate" as defined herein includes metal and ceramic flow-through monoliths having a plurality of channels or cells which extend longitudinally along the length of the substrate structure and wherein the channels are open at both ends thereof; and metal and ceramic filters including ceramic wall-flow filters having a plurality of channels or cells which extend longitudinally along the length of the substrate structure and wherein channels at a first end of the substrate that are open are blocked at the opposite end and channels that are open at the opposite end are blocked at the first end, the arrangement being such that every other adjacent cell has an open end (or a blocked end) on the first end of the wall-flow filter and a blocked end (or an open end) on the opposite end thereof so that when an end of the wall-flow filter is viewed it resembles a chess board of open and blocked channels. Fluid communication between the open channels at the first end of the wall-flow filter and the open channels of the opposite end thereof is via the porous wall structure of the wall-flow filter.

Alternatively, the substrate may be a plate-type substrate.

The substrate may be an inert substrate. The substrate may be composed of a ceramic material or a metallic material. For example, the substrate may be made or composed of cordierite (SiO2-Al2O3-MgO), silicon carbide (SiC), Fe—Cr—Al alloy, Ni—Cr—Al alloy, aluminum titanate or a stainless-steel alloy.

Where it is desirable that a catalyst article is multi-functional (i.e. it simultaneously performs more than catalytic function), the substrate may already possess catalytic activity prior to being coated with the slurry formed in step (a) of the first aspect. For example, the substrate may be an all-active extrudate. Alternatively, the substrate may already comprise a first washcoat layer. In this example, the slurry formed in step (a) may be coated as a second washcoat layer on top of the first, and/or, where the first washcoat layer does not cover the entire length of the substrate, may be coated as an adjacent or overlapping washcoat layer. For example, where the present invention provides an SCR catalyst, the slurry may be coated on top of or at a position which in use would be upstream of an ASC catalyst.

In principle, the substrate may be of any shape or size. However, the shape and size of the substrate is usually selected to optimise exposure of the catalytically active materials in the catalyst article to the exhaust gas in use.

Step (b) may be carried out at ambient temperature. Preferably, step (b) is carried out at a temperature in the range 10 to 35° C., preferably in the range 10 to 30° C., more preferably 18 to 28° C.

Most preferably steps (a) and (b) are both carried out at a temperature in the range 10 to 35° C., for example in the range 10 to 30° C. or 18 to 28° C.

The coated substrate formed in step (b) may undergo a drying process prior to calcination in step (c). Thus, the method of the first aspect may further comprise drying the coated substrate formed in step (b) prior to carrying out step (c).

Drying of the coated substrate may be carried out at temperatures of less than 120° C. For example, drying of the coated substrate may be carried out at a temperature of about 100° C. Drying may be carried out statically (for example, using a batch oven) or continuously (for example, using a belt furnace).

In step (c) of the first aspect, the (optionally dried) coated substrate formed in step (b) undergoes calcination to form a catalyst layer on the substrate comprising metal-loaded molecular sieve. The term "calcine" or "calcination" refers to a thermal treatment step. Calcination causes the catalytically active material to become fixed to the substrate as well as removal of any remaining solvent and any residual organic components, such as organics derived from decomposition of active metal precursors or from organic additives included in the slurry formed in step (a).

Without wishing to be bound by theory, it is believed that at least some metal-loading of the molecular sieve occurs during calcination of the coated substrate. For example, it is possible that a solid-state ion-exchange takes place during calcination.

Calcination of the coated substrate may be carried out via techniques well known in the art. In particular, calcination may be carried out statically (for example, using a batch oven) or continuously (for example, using a belt furnace).

Preferably, calcination step (c) is carried out at temperatures up to 550° C., preferably in the range 450 to 550° C.

Preferably, the coated substrate is calcined for up to 3 hours, preferably from 30 minutes to 2 hours.

The calcination carried out in step (c) may comprise multiple thermal treatment steps, for example, the coated substrate may be subjected to a first thermal treatment at a first temperature, and then subjected to a second thermal treatment at a second temperature.

Drying and calcination may optionally be combined in a continuous process, wherein the coated substrate is conveyed on a belt furnace through multiple heating zones, each zone being set to a different temperature.

The catalyst article according to the second aspect of the present disclosure may be employed for treating a flow of a combustion exhaust gas. That is, the catalyst article can be used to treat an exhaust gas derived from a combustion process, such as from an internal combustion engine (whether mobile or stationary), a gas turbine or a power plant (such as a coal or oil-fired power plant). A preferred application for the catalyst article of the present disclosure is in an exhaust system for an automotive vehicle. In particular, the catalyst article may be employed as an SCR catalyst.

In some embodiments, for example, where it is desired that the catalyst article is multi-functional (i.e. it simultaneously performs more than catalytic function), subsequent to step (b), the method of the first aspect may include a step of coating a further washcoat composition onto the substrate. The further washcoat composition may be applied directly on top of the coating applied in step (b) or at a position proximal thereto. Such a step may be carried out either before or after step (c).

The catalyst article may be part of an emission gas treatment system wherein the catalyst article is disposed downstream of a source of a nitrogenous reductant.

EXAMPLES

The invention will now be further described with reference to the following examples, which are illustrative, but not limiting of the invention.

Comparative Example

Particulate SSZ-13 (CHA) zeolite was combined with water to form a slurry having a solids content of 37 wt % and then the particle size of the zeolite was reduced to a D90 of 7 μm using a bead mill.

Copper acetate was added to the slurry and the resulting mixture was heated to 70° C. for 4 hours. After cooling to room temperature, a sample of the slurry was taken for ICP analysis which confirmed that greater than 84% of copper uptake had taken place.

To replace water lost by evaporation during heating, additional water was added to the slurry such that the solids content was adjusted back to 37 wt %. Tetraethylammonium hydroxide (TEAOH) was then added to complex any free copper ions remaining in the supernatant.

A binder component (water soluble boehmite—Dispersal, available from Sasol) was then added to the slurry, which was then stirred under continuous high shear conditions until it was homogenized.

In order that the slurry was suitable for washcoating, the rheology of the slurry was adjusted by the addition of a cellulose rheology modifier. The pH of the slurry was adjusted to 3.8 by the addition of a base.

The final slurry was then washcoated onto a square-cell, ceramic flow-through substrate using a vacuum deposition washcoating technique (as described in WO 99/47260). The coated substrate was then dried to complete dryness using a dynamic line drier. The dried coated substrate was then calcined on a dynamic line calciner at 500° C. for at least 30 minutes to form a catalyst layer on the substrate.

The quantitative proportions of the starting materials were selected such that catalyst layer contained 87.5 wt % copper-loaded zeolite and 12.5 wt % alumina.

Example 1

Particulate SSZ-13 (CHA) zeolite was combined with water to form a slurry having a solids content of 37% and the particle size of the zeolite was reduced to a D90 of 7 μm using a bead mill.

Copper carbonate was added to the slurry and the resulting mixture was stirred under high sheer conditions for a minimum of 20 minutes. The quantity of copper carbonate was selected to give an equivalent wt % of copper in the final slurry as provided in the Comparative Example.

A binder component (water soluble boehmite—Dispersal, available from Sasol) was then added to the slurry, which was then stirred under continuous high shear conditions until it was homogenized.

In order that the slurry was suitable for washcoating, the rheology of the slurry was adjusted by the addition of a cellulose rheology modifier. The pH of the slurry was adjusted to approximately 3.8 by the addition of a base.

The final slurry was then washcoated onto a substrate having the same shape and dimensions as that employed in the Comparative Example in the same manner as described in relation to the Comparative Example. The coated substrate was then dried and calcined in the same manner as described in the Comparative Example.

The quantitative proportions of the starting materials were selected such that final catalyst layer contained 87.5 wt. % copper and zeolite and 12.5 wt. % alumina.

Example 2

Example 1 was repeated except that the pH of the slurry was adjusted to 4.

Example 3

Example 1 was repeated except that the pH of the slurry was adjusted to 7.

Catalyst Testing

Identical volume core samples were taken from the catalyst articles prepared in each of the Comparative Example and Examples 1 to 3 and tested in a synthetic catalytic activity test (SCAT) apparatus using the following inlet gas mixture at selected inlet temperatures: 500 ppm NO, 750 ppm $NH_3$, 10% $H_2O$, 5% $O_2$, 350 ppm CO, balance $N_2$ at a flow rate of 31.6 L/min. The catalyst samples were tested both in a fresh condition and after hydrothermal ageing (800° C. for 16 hours in 10% water).

Figure 2:
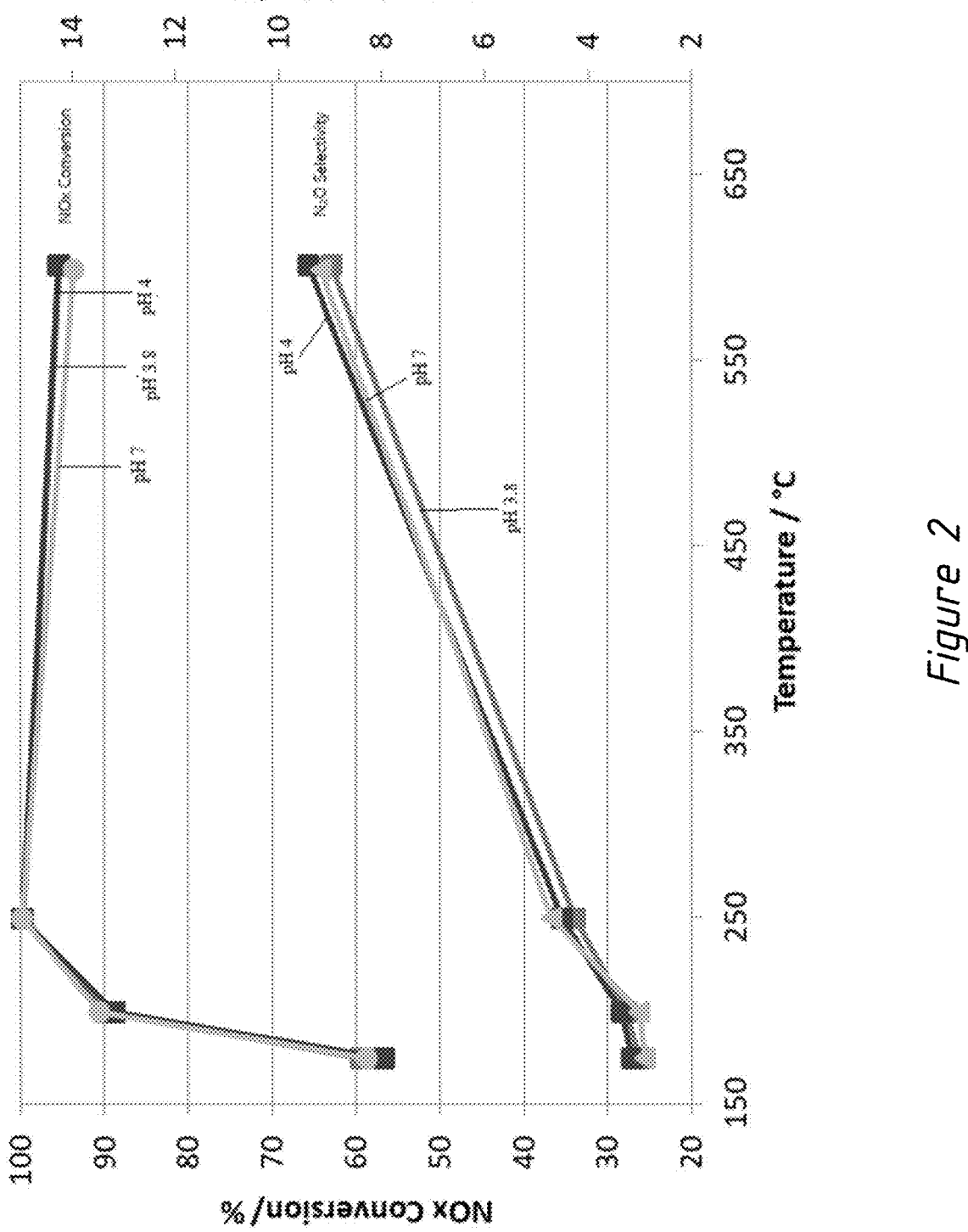
FIG. 2 is a graph showing NOx conversion and N2O selectivity achieved by catalysts prepared according to the first aspect of the present disclosure.

The results are shown in FIGS. 1 and 2.

FIG. 1 compares the NOx conversion rate and N2O selectivity achieved by the catalyst articles of Example 1 and the Comparative Example at the selected inlet temperatures.

FIG. 2 compares the NOx conversion rate and $N_2O$ selectivity achieved by the catalyst articles of Examples 1 to 3 at the selected inlet temperatures.

As demonstrated by the data shown in FIG. 1, the catalyst article of Example 1 achieves comparable NOx conversion rates and similar or slightly improved N2O selectivity compared to the Comparative Example.

Advantageously, the preparation of Example 1 required fewer process steps and reduced water and energy consumption compared to the overall preparation of the Comparative Example.

As demonstrated by the data shown in FIG. 2, changes in pH of the slurry for washcoating has little impact on the performance of final catalyst articles.

Further aspects and embodiments of the present disclosure are set out in the following numbered clauses:

Clause 1. A method for forming a catalyst article comprising:
(a) forming a slurry by mixing together at least the following components:
(i) a crystalline molecular sieve in an $H^+$ or $NH_4^+$ form;
(ii) an insoluble active metal precursor;
(iii) an aqueous solvent;
wherein the slurry has a solids content of up to 50 weight % and wherein step (a) is carried out at a temperature in the range 10 to 35° C.;

(b) coating a substrate with the slurry formed in step (a); and
(c) calcining the coated substrate formed in step (b) to form a catalyst layer on the substrate.

Clause 2. A method as defined in clause 1 wherein in step (a) the components to be mixed together further include (iv) a binder component and/or (v) a rheology modifier.

Clause 3. A method for forming a catalyst article comprising:
(a) forming a slurry by mixing together the following components:
(i) a crystalline molecular sieve in an $H^+$ or $NH_4^+$ form;
(ii) an insoluble active metal precursor;
(iii) an aqueous solvent;
(iv) a binder component;
(v) optional rheology modifier;
wherein the slurry has a solids content of up to 50 weight % and wherein step (a) is carried out at a temperature in the range 10 to 35° C.;
(b) coating a substrate with the slurry formed in step (a); and
(c) calcining the coated substrate formed in step (b) to form a catalyst layer on the substrate.

Clause 4. A method for forming a catalyst article consisting of:
(a) forming a slurry by mixing together the following components:
(i) a crystalline molecular sieve in an $H^+$ or $NH_4^+$ form;
(ii) an insoluble active metal precursor;
(iii) an aqueous solvent;
(iv) a binder component;
(v) optional rheology modifier,
wherein the slurry has a solids content of up to 50 weight % and wherein step (a) is carried out at a temperature in the range 10 to 35° C.;
(b) coating a substrate with the slurry formed in step (a);
($b^i$) optionally drying the coated substrate formed in step (b);
(c) calcining the coated substrate formed in step (b) or ($b^i$) to form a catalyst layer on the substrate.

Clause 5. A method as defined in clause 2, 3 or 4 wherein the binder component is selected from alumina, alumina precursors, aluminium hydroxide, $TiO_2$, $SiO_2$, $ZrO_2$, $CeZrO_2$, $SnO_2$, aluminophosphate, non-zeolitic aluminosilicate, silica-alumina, clays or mixtures thereof.

Clause 6. A method as defined in clause 5 wherein the binder component is an alumina precursor selected from boehmite and bayerite.

Clause 7. A method as defined in any of clauses 2 to 6 wherein the rheology modifier is selected from a polysaccharide, a starch, a cellulose, an alginate, or mixtures thereof.

Clause 8. A method as defined in any preceding clause wherein the relative quantitative proportions of the components used in step (a) are selected such that the catalyst layer formed in step (c) comprises 85 to 92 wt % of metal-loaded molecular sieve and 8 to 15 wt % binder.

Clause 9. A method as defined in any preceding clause wherein the crystalline molecular sieve is a small or medium pore molecular sieve.

Clause 10. A method as defined in any preceding clause wherein the crystalline molecular sieve is a small pore molecular sieve.

Clause 11. A method as defined in clause 10 wherein the small pore molecular sieve has a Framework Type selected from AEI, AFT, AFX, CHA, DDR, ERI, KFI, LEV, LTA, SFW and RHO.

Clause 12. A method as defined in any preceding clause wherein the crystalline molecular sieve is a small pore zeolite having a Framework Type selected from CHA, AEI or AFX, LTA or ERI.

Clause 13. A method as defined in clause 9 wherein the crystalline molecular sieve is a medium pore molecular sieve.

Clause 14. A method as defined in clause 13 wherein the medium pore molecular sieve has a Framework Type selected from FER, MEL, MFI, STI and STT.

Clause 15. A method as defined in any preceding clause, wherein the crystalline molecular sieve is a zeolite.

Clause 16. A method as defined in clause 15 wherein the zeolite has a silica-to-alumina ratio (SAR) of 5 to 200, 5 to 100, 10 to 80, or 5 to 30.

Clause 17. A method as defined in any preceding clause wherein the crystalline molecular sieve is in particulate form and has D90 particle size of less than 10 μm.

Clause 18. A method as defined in clause 17 wherein the crystalline molecular sieve has a D90 particle size in the range 2 to 9 μm, or in the range 2 to 8 μm.

Clause 19. A method as defined in any preceding clause wherein component (i) comprises two or more crystalline molecular sieves in an $H^+$ or $NH_4^+$ form.

Clause 20. A method as defined in any preceding clause wherein the insoluble active metal precursor has a water solubility of less than 1 g/100 ml, less than 0.1 g/100 ml, or less than 0.01 g/100 ml.

Clause 21. A method as defined in any preceding clause wherein the insoluble active metal precursor is selected from a metal carbonate, a metal hydroxide, a metal oxalate or mixtures of any two or more thereof.

Clause 22. A method as defined in any preceding clause wherein the insoluble active metal precursor comprises a salt of copper, manganese, nickel, cobalt, iron, palladium, platinum, cerium, yttrium, niobium, lanthanum, zinc, calcium, magnesium or any mixture of two or more thereof.

Clause 23. A method as defined in any preceding clause wherein the insoluble active metal precursor is selected from the group consisting copper carbonate, manganese carbonate, nickel carbonate, cobalt carbonate, iron carbonate, palladium carbonate, platinum carbonate, cerium carbonate, yttrium carbonate, niobium carbonate, lanthanum carbonate, zinc carbonate, zirconium carbonate, calcium carbonate, magnesium carbonate, copper hydroxide, manganese hydroxide, nickel hydroxide, cobalt hydroxide, iron hydroxide, palladium hydroxide, platinum hydroxide, cerium hydroxide, yttrium hydroxide, niobium hydroxide, lanthanum hydroxide, zinc hydroxide, zirconium hydroxide, calcium hydroxide, magnesium hydroxide, copper oxalate, calcium oxalate, iron oxalate, manganese oxalate, cobalt oxalate, cerium oxalate, yttrium oxalate, zinc oxalate and any mixture of two or more thereof.

Clause 24. A method as defined in any preceding clause wherein the insoluble active metal precursor comprises one or more of copper (II) carbonate, copper (II) hydroxide, and copper oxalate.

Clause 25. A method as defined in any preceding clause wherein the insoluble active metal precursor comprises copper (II) carbonate.

Clause 26. A method as defined in any preceding clause wherein the insoluble active metal precursor comprises a mixture of copper (II) carbonate and cerium carbonate.

Clause 27. A method as defined in any preceding clause wherein the insoluble active metal precursor comprises one or more metal salts which undergo thermal decomposition by thermolysis at temperatures of less than 500° C.

Clause 28. A method as defined in any preceding clause wherein in step (a) the components to be mixed together further include: (vi) a soluble active metal precursor.

Clause 29. A method as defined in any preceding clause wherein the aqueous solvent consists essentially of water.

Clause 30. A method as defined in any preceding clause wherein the aqueous solvent is water.

Clause 31. A method as defined in any preceding clause wherein the slurry formed in step (a) has a solids content in the range 30 to 50 wt %, or in the range 30 to 48 wt %.

Clause 32. A method as defined in any preceding clause wherein in step (a) the components are mixed together by stirring.

Clause 33. A method as defined in any preceding clause wherein step (a) is carried out at ambient temperature.

Clause 34. A method as defined in any preceding clause wherein step (a) is carried out at a temperature in the range 10 to 30° C., preferably 18 to 28° C.

Clause 35. A method as defined in any preceding clause wherein the substrate is a honeycomb monolith substrate.

Clause 36. A method as defined in clause 35 wherein the honeycomb monolith substrate is a flow-through monolith.

Clause 37. A method as defined in clause 35 wherein the honeycomb monolith substrate is a wall-flow filter.

Clause 38. A method as defined in any preceding clause wherein step (b) is carried out at ambient temperature.

Clause 39. A method as defined in any preceding clause wherein step (b) is carried out at a temperature in the range 10 to 35° C., or in the range 10 to 30° C., or in the range 18 to 28° C.

Clause 40. A method as defined in any preceding clause wherein step (b) is carried out at a temperature in the range 10 to 35° C., or in the range 10 to 30° C., or in the range 18 to 28° C.

Clause 41. A method as defined in any preceding clause, which method further comprises drying the coated substrate formed in step (b) prior to step (c).

Clause 42. A method as defined in any preceding clause wherein step (c) is carried out at a temperature of up to 550° C., preferably at a temperature in the range 450 to 550° C.

Clause 43. A method as defined in any preceding clause wherein in step (c) calcination is carried out for a period of up to 3 hours, preferably 30 minutes to 2 hours.

Clause 44. A method as defined in any preceding clause, wherein the catalyst layer formed in step (c) comprises a metal-loaded molecular sieve.

Clause 45. A method as defined in any preceding clause wherein the catalyst layer formed in step (c) comprises a metal-loaded molecular sieve which is catalytically active for SCR.

Clause 46. A method as defined in any preceding clause, wherein during step (c) at least some metal-loading of the molecular sieve occurs.

Clause 47. A catalyst article obtained or obtainable by the method as defined in any preceding clause.

Clause 48. A catalyst article as defined in clause 47 which is configured as a flow-through honeycomb monolith or a wall-flow filter.

Clause 49. A catalyst article as defined in clause 47 or 48 which is catalytically active for SCR.

Clause 50. An exhaust system comprising: a source of nitrogenous reductant and an injector for injecting a nitrogenous reductant into a flowing exhaust gas, wherein the injector is disposed upstream from a catalyst article as defined in clause 49.

The invention claimed is:

1. A method for forming a catalyst article comprising:
   (a) forming a slurry by mixing together at least the following components:
      (i) a crystalline molecular sieve in an $H^+$ or $NH_4^+$ form;
      (ii) an insoluble active metal precursor comprising a metal carbonate;
      (iii) an aqueous solvent;
      wherein the slurry has a solids content of up to 50 weight % and wherein step (a) is carried out at a temperature in the range 10 to 35° C.;
   (b) coating a substrate with the slurry formed in step (a), wherein the slurry is not subjected to further processing steps prior to coating; and
   (c) calcining the coated substrate formed in step (b) to form a catalyst layer on the substrate.

2. The method of claim 1, wherein in step (a) the components to be mixed together further include (iv) a binder component and/or (v) a rheology modifier.

3. The method of claim 2, wherein the binder component is selected from alumina, alumina precursors, aluminium hydroxide, $TiO_2$, $SiO_2$, $ZrO_2$, $CeZrO_2$, $SnO_2$, aluminophosphate, non-zeolitic aluminosilicate, silica-alumina, clays or mixtures thereof.

4. The method of claim 2, wherein the rheology modifier is selected from a polysaccharide, a starch, a cellulose, an alginate, or mixtures thereof.

5. The method of claim 1, wherein the relative quantitative proportions of the components used in step (a) are selected such that the catalyst layer formed in step (c) comprises 85 to 92 wt % of metal-loaded molecular sieve and 8 to 15 wt % binder.

6. The method of claim 1, wherein the crystalline molecular sieve is a small pore zeolite having a Framework Type selected from CHA, AEI or AFX, LTA or ERI.

7. The method of claim 1, wherein the insoluble active metal precursor is selected from the group consisting of copper carbonate, manganese carbonate, nickel carbonate, cobalt carbonate, iron carbonate, palladium carbonate, platinum carbonate, cerium carbonate, yttrium carbonate, niobium carbonate, lanthanum carbonate, zinc carbonate, zirconium carbonate, calcium carbonate, magnesium carbonate, and any mixture of two or more thereof.

8. The method of claim 1, wherein the insoluble active metal precursor comprises copper (II) carbonate.

9. The method of claim 1, wherein the aqueous solvent is water.

10. The method of claim 1, wherein the slurry formed in step (a) has a solids content in the range 30 to 50 wt %.

11. The method of claim 1, wherein step (a) is carried out at a temperature in the range 10 to 30° C.

12. The method of claim 1, wherein step (b) is carried out at a temperature in the range 10 to 35° C.

13. The method of claim 1, wherein the slurry formed in step (a) has a solids content in the range 30 to 48 wt %.

14. A catalyst article obtained by the method as defined in claim 1.

15. The catalyst article of claim 14, which is catalytically active for SCR.

16. An exhaust system comprising: a source of nitrogenous reductant and an injector for injecting a nitrogenous reductant into a flowing exhaust gas, wherein the injector is disposed upstream from the catalyst article of claim 15.

17. The method of claim 1, wherein step (a) is carried out at a temperature in the range 18 to 28° C.

18. The method of claim 1, wherein step (b) is carried out at a temperature in the range 10 to 30° C.

19. The method of claim 1, wherein step (b) is carried out at a temperature in the range 18 to 28° C.

20. The method of claim 1, wherein the insoluble active metal precursor comprises a mixture of copper (II) carbonate and cerium carbonate.

* * * * *